US011962669B1

(12) United States Patent
Almeida Dos Santos et al.

(10) Patent No.: US 11,962,669 B1
(45) Date of Patent: Apr. 16, 2024

(54) DETERMINING DIGITAL CONTENT SERVICE QUALITY LEVELS BASED ON CUSTOMIZED USER METRICS

(71) Applicant: Microsoft Technology Licensing, LLC, Redmond, WA (US)

(72) Inventors: José Carlos Almeida Dos Santos, Lisbon (PT); Naseer Ud Din Ahmed Batt, Bellevue, WA (US); Prateek Tiwari, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/954,177

(22) Filed: Sep. 27, 2022

(51) Int. Cl.
*G06F 15/16* (2006.01)
*H04L 67/61* (2022.01)

(52) U.S. Cl.
CPC ..................... *H04L 67/61* (2022.05)

(58) Field of Classification Search
CPC ............... H04L 67/61; H04L 67/55
USPC ............... 709/225–226, 202–203
See application file for complete search history.

(56) References Cited

U.S. PATENT DOCUMENTS

| | | | | |
|---|---|---|---|---|
| 9,311,416 B1* | 4/2016 | Goel | .................. | G06F 16/9537 |
| 9,836,545 B2* | 12/2017 | LuVogt | .................. | G06Q 30/02 |
| 9,948,535 B2* | 4/2018 | Suri | .................. | H04L 67/61 |
| 11,223,545 B2* | 1/2022 | Harb | .................. | H04N 21/8456 |
| 11,816,096 B2* | 11/2023 | Mansour | .................. | H04L 51/04 |
| 2004/0039820 A1* | 2/2004 | Colby | .................. | H04L 67/51 |
| | | | | 709/226 |
| 2020/0342066 A1* | 10/2020 | Lewis | .................. | G06F 16/9558 |
| 2022/0022100 A1* | 1/2022 | Beattie, Jr. | .................. | H04W 24/08 |
| 2022/0277205 A1* | 9/2022 | Mahmood | .................. | G06N 3/08 |

\* cited by examiner

Primary Examiner — Bharat Barot
(74) Attorney, Agent, or Firm — Ray Quinney & Nebeker; Christopher Hallstrom

(57) ABSTRACT

The present disclosure relates to utilizing a content service system to improve selecting data sources that are used to retrieve digital content items in response to content requests. For example, in response to receiving a content request, the content service system determines to retrieve content items by either calling a lower-quality data source with lower computing costs based on the request having lower service quality metrics or by calling a higher-quality data source with higher computing-costs based on the request having superior service quality metrics. In many instances, the service quality metric is based on the user characteristics of a user identifier associated with the requesting device. By dynamically determining to utilize different data sources having different computing costs based on service quality metrics, the content service system significantly reduces the total amount of computing costs for retrieving and providing digital content, without hurting the user experience.

20 Claims, 10 Drawing Sheets

DETERMINING DIGITAL CONTENT SERVICE QUALITY LEVELS BASED ON CUSTOMIZED USER METRICS

BACKGROUND

Recent years have seen significant advancements in both hardware and software with respect to accessing, managing, and sharing digital content. For instance, modern computing systems provide increasing amounts of digital content to individuals as they use internet-connected devices. To illustrate, popular web services that provide digital content are frequently subject to a large volume of requests per second where requests could include retrieving multiple digital content items (e.g., selected from tens of millions of digital content items). In peak times, a web service can receive over 100,000 requests per second. These requests further grow as the number of internet-connected devices increases.

With these and other advances, computing systems continue to face several technical shortcomings that result in inefficient, inaccurate, and inflexible operations, particularly in the area of digital content retrieval. To illustrate, each request for digital content incurs computing costs in terms of bandwidth, latency, and computer processing resources (e.g., memory and processor usage). For example, when a back-end machine receives a request from a client device, it commonly makes an application programming interface (API) call to a data source or service to retrieve the requested digital content items. These API calls contribute to a large portion of the computing costs of providing digital content to client devices.

As mentioned, back-end machines often make API calls to a data source to retrieve requested digital content items. Currently, existing computer systems inefficiently retrieve digital content items from data sources. For example, some existing computer systems retrieve all of their digital content from data sources that require higher computing costs (e.g., larger bandwidth or latency) even when a lower computing cost data source is available because the lower computing cost data source may provide inaccurate versions of the digital content items. Further, many of these existing computer systems access the higher computing cost data source without considering if the higher computing cost is worth the user benefit.

Additionally, many existing computer systems are inflexible in that they fail to fully consider the source of a request when retrieving digital content. In particular, several existing computer systems provide many services utilizing the same back-end methods for all client devices. For example, when multiple individuals open a news page on a web browser application, existing computer systems may customize new stories for each user, but they access all of the news stories from the same data source for all users. As a result, these existing computer systems rigidly follow predetermined methods that are often inefficient for serving digital content.

These and other problems result in significant inefficiencies, inaccuracies, and inflexibilities of existing computing systems with respect to utilizing back-end services in response to digital content requests.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
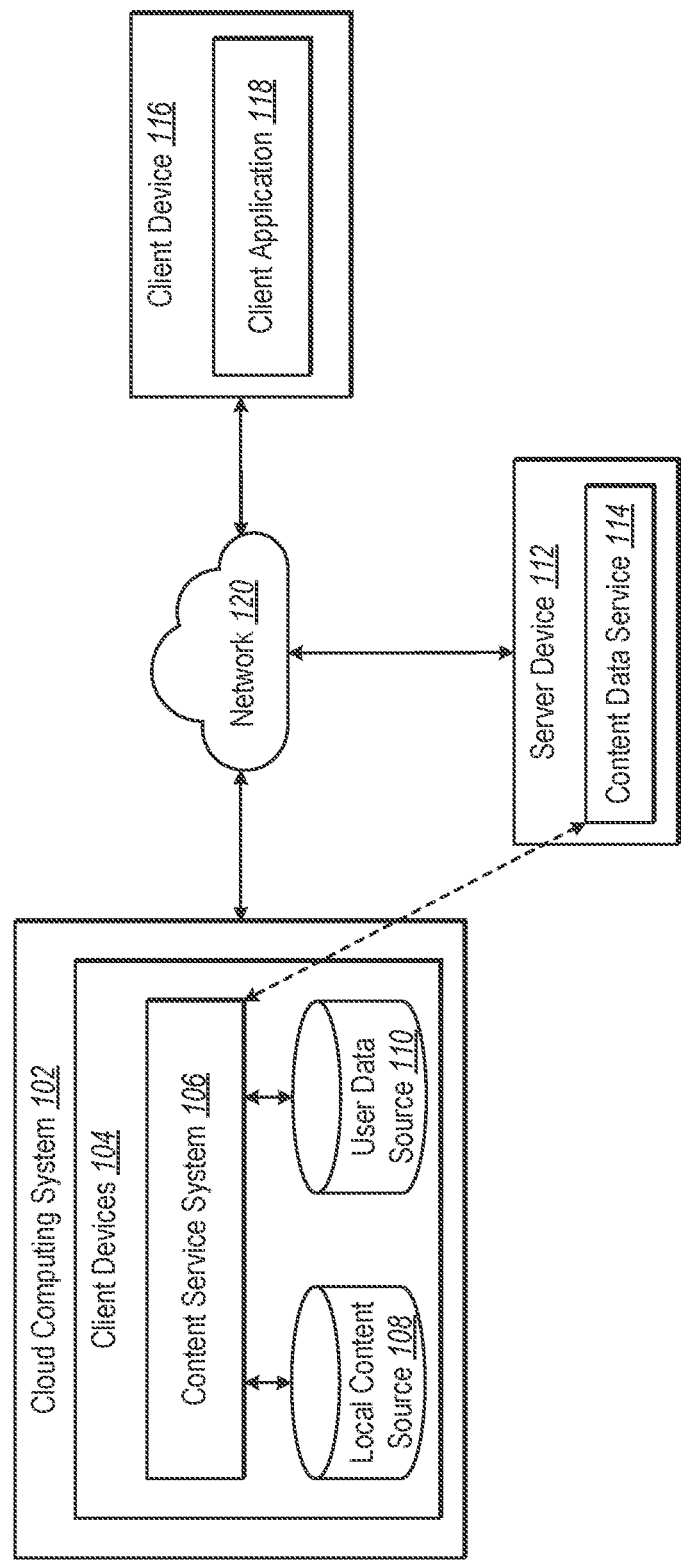
FIGS. 1A-1B illustrate an example diagram of a computing system environment where a content service system is implemented in accordance with one or more implementations.

Implementations of the present disclosure provide benefits and/or solve one or more of the foregoing or other problems in the art with systems, non-transitory computer-readable media, and methods by utilizing a content service system to improve selecting data sources that are used to retrieve digital content items in response to content requests. For example, in response to receiving a content request, the content service system determines to retrieve content items by either calling a lower-quality data source with lower computing costs based on the request having lower service quality metrics or by calling a higher-quality data source with higher computing-costs based on the request having superior service quality metrics. In many instances, the content service system determines the service quality metric of a request from a requesting device based on the user characteristics of a user identifier associated with the requesting device. By dynamically determining to utilize different data sources having different computing costs based on service quality metrics, the content service system significantly reduces the total amount of computing costs for retrieving and providing digital content, without hurting the user experience.

To illustrate, suppose a user on a client device opens up a new browser application tab (i.e., a new webpage) that is populated with various types of digital content (e.g., news articles, weather, stocks, videos, products, social posts, and other links). As part of loading the webpage, the content service system receives a request to provide digital content items of a given content type. In response, the content service system determines a service quality metric for the digital content type, which, in many instances, corresponds to how likely the user is to interact with the digital content type. Based on the service quality metric for the digital content type, the content service system selects a data source having a corresponding service quality level. For example, for a superior, high, or favorable service quality metric, the content service system utilizes a high-quality data source, even if it has higher computing costs, to retrieve digital content. For an average or lower service quality metric, the content service system sends a service call to an average-quality or lower-quality data source that has significantly lower computing costs (e.g., smaller bandwidth and latency, fewer processing needs).

To elaborate, in many implementations, the content service system (i.e., the digital content service quality level system) receives a content request to display content items of a given digital content type on a website of a client device associated with a user identifier. To fulfill the request, the content service system needs to retrieve content having the given digital content type (e.g., the target digital content type) from a data source. Accordingly, to begin fulfilling the content request, the content service system first generates a set of user characteristics based on user data associated with the user identifier. The content service system then determines a service quality metric based on the first set of user characteristics and a model associated with the given digital content type. In addition, the content service system selects a data source from multiple data sources based on the service quality metric and sends a service call to the selected data source to retrieve digital content items of the given digital content type. Further, the content service system provides retrieved digital content items to the requesting device (e.g., displayed on the website) in response to the content request.

As described herein, the content service system provides several technical benefits in terms of computing efficiency, accuracy, and flexibility compared to existing computing systems. Indeed, the content service system provides several practical applications that deliver benefits and/or solve problems associated with digital content retrieval from multiple data sources, as further provided below.

As mentioned above, existing computer systems often use the same data source to retrieve digital content for all requests of a given digital content type. If the data source requires an expensive API call, then an existing computer system risks inefficiently wasting large amounts of bandwidth and processing resources on every call. Furthermore, each of the expensive API calls incurs long latency wait times. Additionally, if the data source is accessible with a cheaper API call, then an existing computer system risks retrieving and providing inaccurate digital content items to a number of users.

In contrast to existing computer systems, the content service system provides improvements in efficiency by dynamically retrieving digital content from one or multiple available data sources of varying quality and costs according to content-based service quality metrics. To illustrate, when a content request for retrieving digital content of a given digital content type is received, the content service system first determines a service quality metric (e.g., via a service quality model) for the user based on the digital content type. In many instances, the service quality metric is based on user characteristics of a user identifier associated with the requesting device, including user engagement levels with digital content types.

Next, based on the service quality metric, the content service system selects and retrieves digital content items from a particular data source (or data service). For the majority of requests (e.g., 90%), the content service system will calculate low service quality metrics (e.g., low user-engagement levels) and thus, determine to retrieve the digital content items from a localized, low computing cost data source, which has a slight chance (e.g., <10%) of retrieving a stale content item (but which is negated by the low user-engagement level). For example, the content service system is able to retrieve digital content items from a localized data source cache between 5-10 milliseconds (ms). By downgrading the majority of content requests, the content service system will significantly reduce digital content retrieval computing costs.

For the few requests for which the content service system determines a favorable service quality metric, the content service system will flexibly send a service call to a higher-quality data source, which may incur higher computing costs (e.g., calls may take 100-500 ms), to retrieve a higher-quality version of the requested digital content. For these few content requests, the content service system ensures that highly accurate digital content items are being provided to users most likely to interface and/or interact with the content. Because the number of these cases is small (e.g., less than 10%), the content service system significantly reduces the number of wasted API calls made to a more expensive data source for digital content that will not be valued by users. This dynamic selection of data sources is beneficial, in terms of efficiency and accuracy, during normal times when the number of requests is about 10,000 requests per second and is particularly beneficial during peak times when the number of requests can surpass over 100,000 requests per second.

To elaborate, in some implementations, the content service system determines a tradeoff point between accuracy and computing costs. As an example, the content service system determines a service quality metric for a digital content type that is used to determine whether to retrieve freshly updated, highly-accurate digital content items from a more computationally-expensive data source or retrieve potentially outdated digital content items from a less-expensive data source. As another example, the content service system determines a service quality metric for a digital content type that is used to determine whether to retrieve more relevant digital content items from an expensive data source or retrieve less relevant digital content items from a less-expensive data source. In this manner, the content service system is able to optimize for both efficiency and accuracy for dynamically and flexibly retrieving digital content items.

As illustrated in the foregoing discussion, the present disclosure utilizes a variety of terms to describe the features and advantages of one or more implementations described herein. For instance, the term "digital content item" (or "content item") refers to a discrete digital data representation of a document, file, image, and/or another data structure having digital content. In particular, a content item can include, but is not limited to, an electronic document, a digital image, a digital video, and/or an electronic communication. Multiple digital content items may be referred to collectively as digital content (or "content").

Similarly, the terms "digital content type" (or "content type") or "type of digital content" refer to a class or category of digital content. In some implementations, digital content type broadly refers to a file type of content, such as documents, videos, images, or links. In various implementations, the term digital content type specifically refers to a particular classification of content, such as news articles, products, advertisements, stock prices, or weather reports. In one or more implementations, the term digital content type refers to a more specific subset of content items, such as products or videos provided by a particular user or entity. Notably, an electronic document of digital content (e.g., a webpage or landing screen) may be separated and/or include different portions that comprise different digital content types.

As used herein, the term "content data source" (or "data source") refers to a device or a group of devices that store digital content. For example, upon receiving a service call, the data source utilizes the information in the service call to identify particular digital content items and return those items to the requesting device. A data source often includes a table that stores content items and updates the table regularly. In some cases, a data source serves as an intermediary device for obtaining requested content. For instance, upon receiving a service call, the data source uses a service to redirect the call to another device or source that will provide back information on the requested content before returning the retrieved content items to the requesting device.

As used herein, the term "service" refers to a provider of digital content. As mentioned above, a data source often includes one or more services to retrieve digital content locally stored by the service or remotely stored. In one or more implementations, a service includes a content provider that obtains content by calling and retrieving the content from other data sources or entities. Additionally, a service also provides an API for making calls and requesting digital content from the service.

As used herein, the term "service call" refers to a query or request to a data source and/or service for a resource. Service calls often occur in the background, meaning unseen from a user on a client device. Examples of service calls include HyperText Markup Language ("HTML") requests or API service calls. For example, the content service system sends an API service call (or "API call") to a data source requesting retrieval of a set of digital content items.

As used herein, the term "digital content request" (or "content request") refers to a query for one or more digital content items corresponding to one or more digital content types. For example, a content request includes a request for multiple content items of the same content type. As another example, a content request includes a request for content items of different content types. Often, a client device associated with a user makes a content request to a server device for digital content items to be displayed to the user, such as within a webpage (e.g., a new tab page).

As used herein, the term "service quality metric" refers to a score, rating, or grade for a user identifier with respect to a given content type. More particularly, a service quality metric scores a user identifier to one of multiple service quality levels for a given content type, which is determined based on a correspondence between the user characteristics of the user identifier and the content items of the given content type. In some implementations, a service quality metric is a binary value that indicates an upgraded service quality level or a degraded service quality level. In various implementations, the service quality metric is a scale or range (e.g., 10-1, A-F, high-to-low, or premium-to-moderate, expensive-to-inexpensive). As provided below, the content service system commonly utilizes a service quality model to determine a service quality metric.

As used herein, the term "service quality model" (or "model") refers to a computer model or computer representation that generates outputs based on a set of inputs. In various implementations, a service quality model is a machine-learning model that is tunable and/or trainable to approximate unknown functions, such as a neural network. In some implementations, a service quality model is an algorithm, set of rules, and/or set of heuristics that determines an output based on applying one or more operations to one or more inputs.

As used herein, the term "user characteristics" refers to data, features, information, and attributes corresponding to a user identifier. For instance, the content service system can generate a set of user characteristics that includes given attributes and/or values generated from user information with respect to a given digital content type. In some instances, the content service system receives a user information vector (i.e., user profile data organized in a vector data structure) that includes user data (e.g., raw user data) for a user identifier and, based on the user information vector, the content service system utilizes a user characteristics model to generate a user characteristic set, which indicates the correspondence between the user identifier and given digital content type. In various implementations, the content service system generates different sets of user characteristics for a user identifier that corresponds to different digital content types.

As used herein, the term "quality service level" refers to a relative level of quality provided by a data source as well as computing costs needed to retrieve content from the data source. Additionally, the quality service level of a data center is inversely proportionate to content retrieval efficiency. For example, the content service system 106 more efficiently retrieves content from a data source with a lower-quality service level and less efficiently retrieves content from another data source with a higher-quality service level.

As used herein, the term "computing cost" refers to bandwidth, latency, and processing requirements. For instance, bandwidth refers to the data capacity needed to request and retrieve content, including across various intermediary networks that the content must travel to reach the content service system 106. Latency refers to the time needed to request and retrieve content. Processing refers to the processor and memory requirements needed to retrieve content. In some cases, a data source includes a data service that queries or communicates with additional data sources or services to retrieve content. In these cases, the collective group of data sources is considered when determining the quality service level of the data source.

Figure 1B:
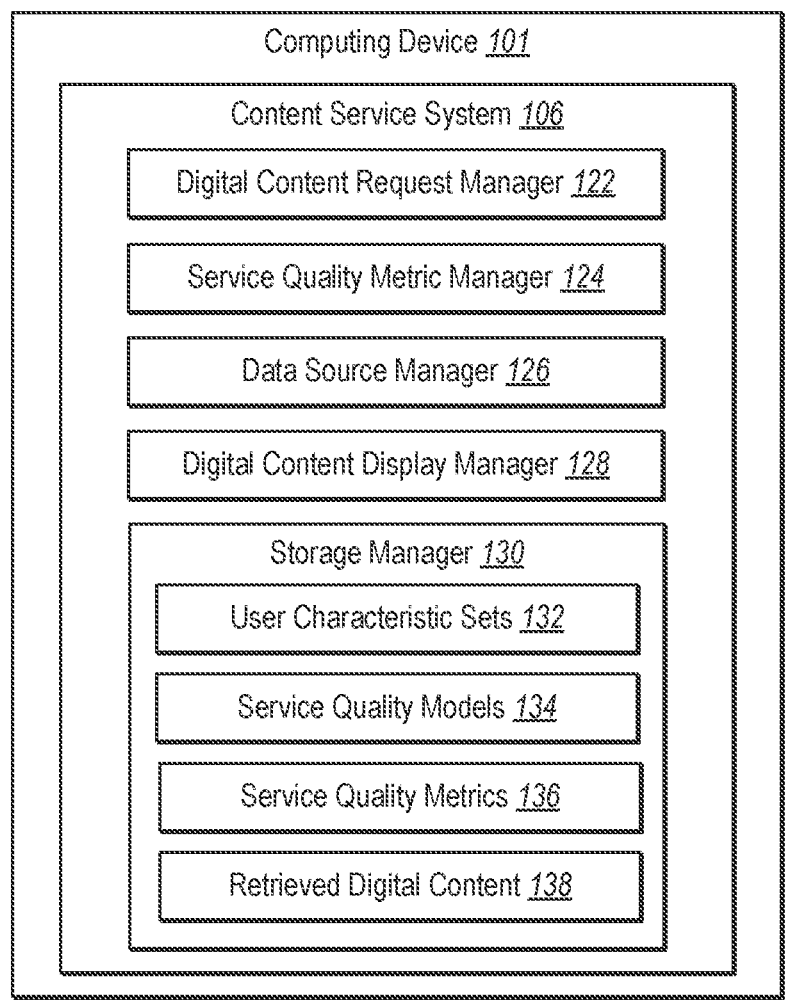

Additional details will now be provided regarding the components and elements of the content service system. To illustrate, FIGS. 1A-1B illustrate a schematic diagram of an environment 100 (i.e., a digital medium system environment) for implementing a content service system 106 (i.e., a digital content service quality level system). In particular, FIG. 1A includes the environment 100 and FIG. 1B provides additional detail regarding components and elements of the content service system 106.

As illustrated in FIG. 1A, the environment 100 includes a cloud computing system 102, a server device 112, and a client device 116 in communication with each other via a network 120. Additional details regarding these and other computing devices are provided below in connection with FIG. 9. In addition, FIG. 9 also provides additional details regarding networks, such as the network 120 shown.

As shown, the environment 100 includes the cloud computing system 102 having computing devices 104. For example, the computing devices 104 include various system devices, service devices, virtual machines, and/or storage devices for providing content and services to client devices and other server devices. In various implementations, the cloud computing system 102 services as a data center that provides services and fulfills requests.

As shown, the computing devices 104 include various components such as the content service system 106, a local content source 108, and a user data store 110. While not shown, the computing devices 104 can include additional devices, such as web hosting systems, analytics systems, and network optimization components. In one or more implementations, the local content source 108 and/or the user data store 110 are located on separate computing devices (or groups of computing devices). In alternative implementations, the local content source 108 and/or the user data store 110 are co-located on the same computing device as the content service system 106. In some implementations, the local content source 108 and/or the user data store 110 are located on computing devices outside of the cloud computing system 102 (e.g., at different physical locations).

As shown, the environment 100 includes the server device 112 having a content data service 114. In one or more implementations, the server device 112 represents one or more computing devices and serves as a content service, repository, storage, or data store for providing requested content. In various implementations, the environment 100 includes any number of content data services or content stores. In some implementations, the content data service 114 is also located in the cloud computing system 102.

As shown, the environment 100 includes the client device 116 having a client application 118. In various implementations, the client device 116 is associated with a user (e.g., a user client device) having one or more user identifiers. In many implementations, a user (i.e., represented by a user identifier) interacts with the cloud computing system 102 to access content and/or services. The environment 100 can include any number of client devices. As also shown, the client device 116 includes a client application 118. For example, the client application is a web browser application, a mobile application, or another type of application that accesses internet-based content.

Returning to the content service system 106, as provided herein, the content service system 106 improves the efficiency and accuracy of computing systems by dynamically selecting a data source, which will retrieve and return requested digital content items in response to content requests. For example, upon the client device 116 providing a content request to the cloud computing system 102, the content service system 106 receives the request and determines how to optimally fulfill the request. More particularly, the content service system 106 determines whether to retrieve content items from a low-computing cost data source (e.g., the local content source 108) or a higher-computing cost data service (e.g., the content data service 114). As part of the determination, in many implementations, the content service system 106 processes data from the user data store 110, as further provided below. Indeed, additional details and components of the content service system 106 are provided in FIG. 1B below.

Although FIG. 1A illustrates a particular number, type, and arrangement of components within the environment 100, various additional environment configurations and arrangements are possible. For example, as shown by the dashed line, the content service system 106 may be directly connected to the content data service 114, bypassing the network 120 or utilizing a separate and/or an additional network. As another example, the environment 100 may include any number of computing devices, such as additional client devices that request content from the cloud computing system 102. Furthermore, the server device 112 may represent a set of connected server devices.

As mentioned above, FIG. 1B provides additional details regarding the capabilities and components of the content service system 106. To illustrate, FIG. 1B shows a computing device 101 having the content service system 106. For example, the computing device 101 represents one of the computing devices 104 within the cloud computing system 102 introduced above. While FIG. 1B provides additional details of the content service system 106, further detail and description regarding implementations of the content service system 106 are provided in subsequent figures.

As illustrated, the content service system 106 includes various components and elements. For example, the content service system 106 includes a data content request manager 122, a service quality metric manager 124, a data source manager 126, a digital content display manager 128, and a storage manager 130. As also shown, the storage manager 130 includes user characteristic sets 132, service quality models 134, service quality metrics 136, and retrieved digital content 138.

As shown, the content service system 106 includes the data content request manager 122. In one or more implementations, the data content request manager 122 receives, identifies, processes, forwards, responds to, and/or otherwise manages content requests. For example, the data content request manager 122 receives a content request from a client device requesting content to be displayed on a webpage. In response, the data content request manager 122 initially processes the content request to identify particular content items and/or content types to provide back to the client device. In various implementations, the data content request manager 122 communicates with the other components of the content service system 106 to fulfill the content request.

As shown, the content service system 106 includes the service quality metric manager 124. In various implementations, the service quality metric manager 124 facilitates generating, creating, modifying, or otherwise managing service quality metrics 136. Additionally, in one or more implementations, the service quality metric manager 124 manages one or more of the service quality models 134 (i.e., content-based service quality models), which are utilized to generate the service quality metrics 136. Additionally, the service quality metric manager 124 manages the generation, creation, modification, and/or use of user characteristic sets 132 as part of generating the service quality metrics 136.

As an example of creating service quality metrics 136, in various implementations, based on receiving a content request, the service quality metric manager 124 obtains a user identifier of the user associated with the client device making the request. Utilizing the user identifier, the service quality metric manager 124 obtains additional user data (e.g., from a user data store 110) and generates a user characteristic set. Further, the service quality metric manager 124 generates the service quality metrics 136 from one or more of the service quality models 134 based on the user characteristic set. Additional details regarding user characteristic sets 132, service quality models 134, and service quality metrics 136 are provided below in connection with FIGS. 4-6.

As also shown, the content service system 106 includes the data source manager 126. In various implementations, the data source manager 126 facilitates, determines, identifies, selects, calls, and/or otherwise manages data sources of digital content. For example, in various implementations, the data source manager 126 determines which data source to use to retrieve content items (i.e., the retrieved digital content 138) in response to a content request. Indeed, in various instances, the data source manager 126 determines to retrieve content items from a local cache data source or a remote data store that may incur additional computing costs. Additional details regarding determining, selecting, and/or communicating with data sources are provided below in connection with FIG. 4 and FIG. 7.

As shown, the content service system 106 includes the digital content display manager 128. In various implementations, the digital content display manager 128 generates, arranges, modifies, provides, and/or otherwise manages retrieved digital content 138 that is to be returned to a client device in response to a content request. For example, the digital content display manager 128 generates a webpage (e.g., a new tab page) by populating the webpage with the retrieved digital content 138. In various implementations, the digital content display manager 128 operates outside of the content service system 106. For example, the content service system 106 provides the retrieved digital content 138 to another system or device that arranges and provides the retrieved digital content 138 to a requesting client device.

Additionally, the content service system 106 includes the storage manager 130. In various implementations, the storage manager 130 includes data used by any of the components of the content service system 106 in performing features and functionality described herein. For example, the storage manager 130 may include the user characteristic sets 132, the service quality models 134, the service quality metrics 136, the retrieved digital content 138, and/or additional data.

Figure 2:
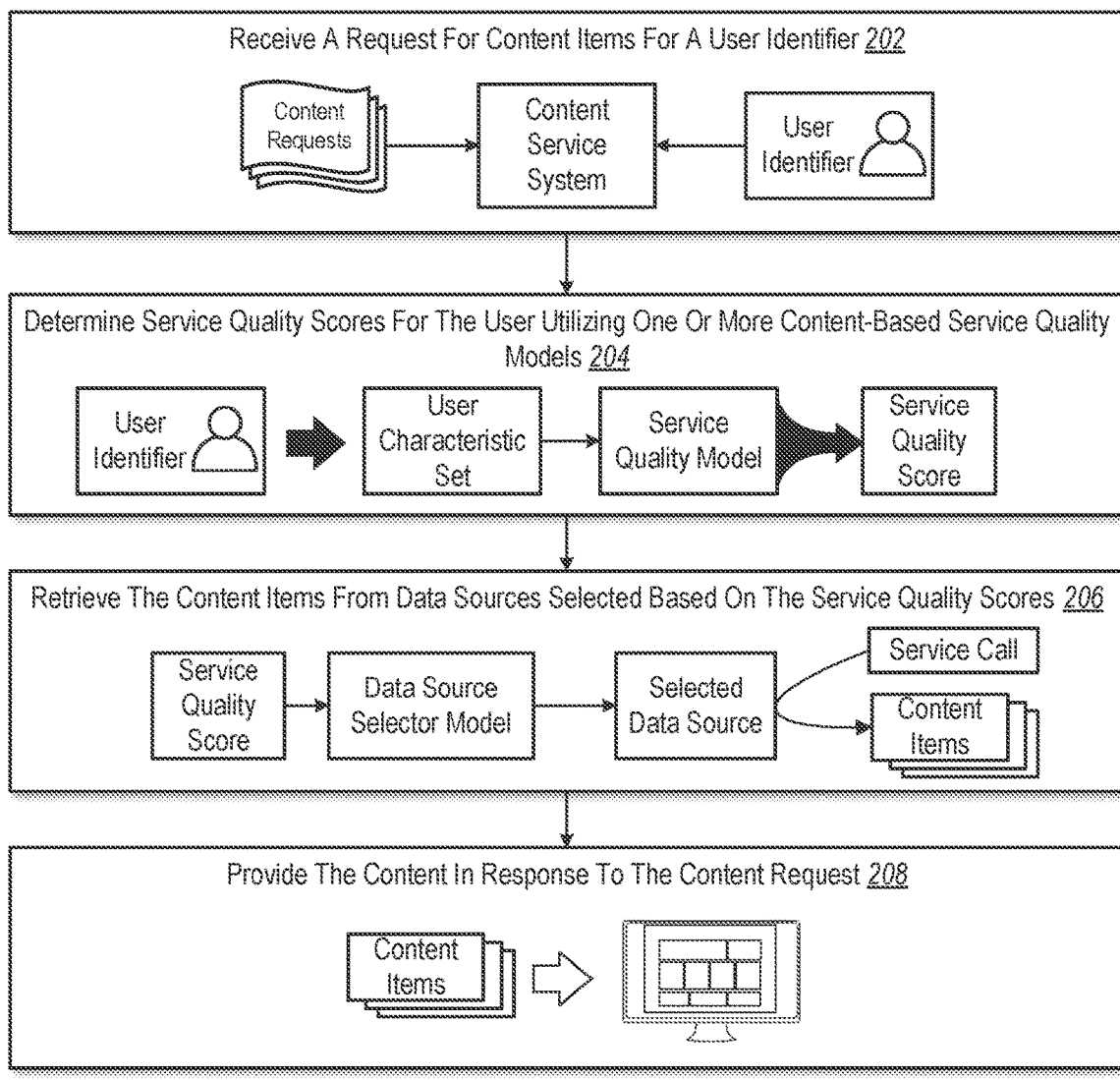
FIG. 2 illustrates an example overview for implementing the content service system to efficiently service digital content in accordance with one or more implementations.

Additional details in connection with an example implementation of the content service system 106 (i.e., the digital content service quality level system) are discussed in connection with FIG. 2. In particular, FIG. 2 illustrates an example overview for implementing the content service system in accordance with one or more implementations. As shown, FIG. 2 illustrates a series of acts 200, where one or more of the acts can be performed by the content service system 106.

As shown in FIG. 2, the series of acts 200 includes an act 202 of receiving a request for content items for a user identifier. For example, a user on a client device opens a new browser tab on a client application (e.g., a web browser). In response, the client device sends a request to the content service system 106 (e.g., via a cloud computing system) to provide digital content to display within the client application (e.g., as a webpage). Additionally, the content service system 106 receives the user identifier of the user in connection with the content request. For example, in some implementations, the content request includes the user identifier of the user.

In addition, FIG. 2 shows that the series of acts 200 includes an act 204 of determining service quality scores for the user utilizing one or more content-based service quality models. For instance, utilizing the user identifier, the content service system 106 obtains additional user information, for which the content service system 106 generates one or more user characteristic sets. The content service system 106 then uses one or more service quality models to generate service quality scores (i.e., service quality metrics) from the user characteristic sets. Additional details regarding generating service quality metrics for a user are provided below in connection with FIGS. 4-6.

As also shown, the series of acts 200 includes an act 206 of retrieving the content items from data sources selected based on the service quality metrics. To illustrate, in various implementations, the content service system 106 determines to call a given data source for retrieving content items from multiple available data sources based on the service quality metrics. For example, if a service quality metric indicates a favorable, higher, or superior score for a given content type, the content service system 106 selects a data source that provides higher-quality content. If, however, the service quality metric is average or less favorable, the content service system 106 determines to call a data source that incurs fewer computing costs.

To elaborate, in various implementations, the content service system 106 has access to multiple data sources. For instance, the content service system 106 may access one data source that maintains a local cache of content items that are updated periodically. In a few cases, this data source may provide lower-quality content, such as stale content that is outdated, generalized content, and/or lower-quality versions of content (e.g., lower resolution images or video). If the data source locally stores content items (e.g., in a data store located in the same cloud computing system and/or data center), the content service system 106 retrieves requested content items with low computing costs (e.g., low latency and bandwidth usage).

In other instances, the content service system 106 may access another data source that provides higher-quality content. For example, this other data source includes a service that will query up-to-date versions of content items, provide more tailored content items, and/or provide higher quality versions of content items. In some cases, however, calls to this other data source are more costly in terms of bandwidth, latency (e.g., delay), and processing. For instance, the data source does not store content items locally but retrieves them from remote sources. In additional implementations, the content service system 106 may select from a wider range of data sources. Accordingly, the content service system 106 utilizes a service quality metric corresponding to a given content type to determine which data source to call to retrieve content items of the given content type. Additional details regarding determining, selecting, and/or communicating with data sources are provided below in connection with FIG. 4 and FIG. 7.

Further, the series of acts 200 includes an act 208 of providing the content in response to the content request. For example, upon receiving the content items from one or more data stores, the content service system 106 (or another system) arranges the content and provides it back to the requesting client device. The client device then displays the retrieved content items within the client application to the user. An example of displaying retrieved content items on a client device is shown in FIG. 3, which is described next.

Figure 3:
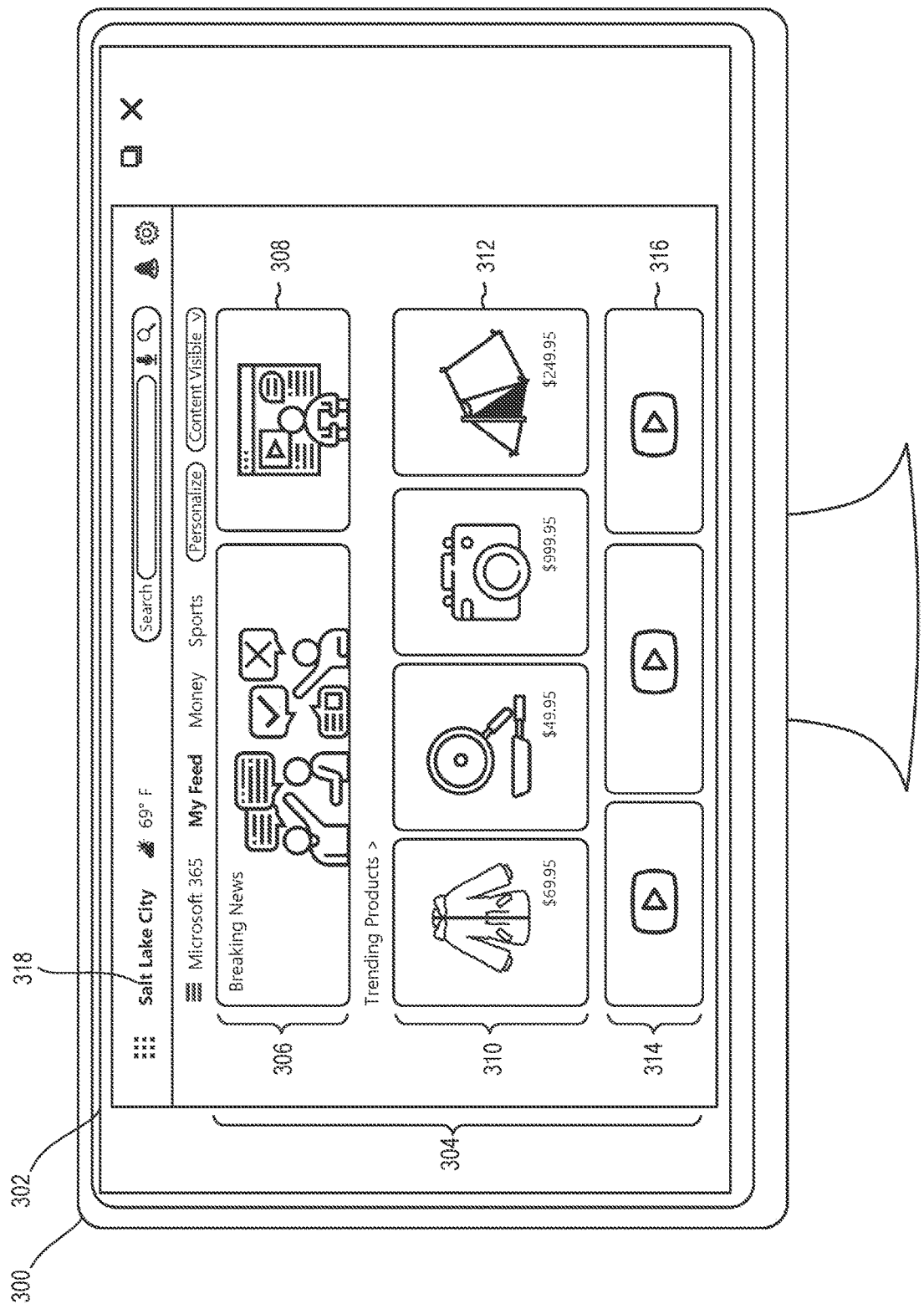
FIG. 3 illustrates an example graphical user interface of multiple types of retrieved digital content items in accordance with one or more implementations.

As just mentioned, FIG. 3 provides an example display of a retrieved content item on a client device. In particular, FIG. 3 illustrates a graphical user interface of multiple types of retrieved digital content items in accordance with one or more implementations. As illustrated, FIG. 3 includes a client device 300 having a graphical user interface that shows a new tab page 302 within a web browser application. In various instances, a new tab page is a new webpage that loads when a new, fresh, or blank tab is opened in the web browser. When a new tab page 302 is shown, the methods and approaches for efficiently providing content apply to other applications where content is being requested from a system.

As shown, the new tab page 302 includes an arrangement of content items (e.g., a first digital content item 308, a second digital content item 312, and a third digital content item 316) shown as content cards. Collectively, the content items in the new tab page 302 may be referred to as digital content 304. In FIG. 3, the content items are grouped and arranged by digital content type. For example, the digital content 304 includes a first digital content type 306 (e.g., shown as news content cards), a second digital content type 310 (e.g., shown as product content cards), and a third digital content type 314 (e.g., shown as video content cards).

In various implementations, the content service system 106 arranges the content items differently. For instance, while multiple content items of the same content type are included, they are not all grouped together (e.g., news content cards are located at various different spots across the new tab page 302). Additionally, for some implementations, the digital content 304 includes one or more content items not grouped with other content items. For example, the digital content 304 includes a stock content card without additional content cards of the same content type.

Similarly, the content service system 106 need not show all content items as cards. For example, the new tab page 302 includes weather content 318 shown as an overlay in the header portion of the new tab page 302. Indeed, content items can be displayed in various layouts, arrangements, and styles.

As mentioned above, in various implementations, the new tab page loads when a new, fresh, or blank tab is opened in a web browser. More specifically, when the client device 300 detects a user opening a new tab page 302, the client device identifies the user identifier of the user. For example, the user identifier is stored as a digital cookie, session variable, or another data type on the client device 300. In various implementations, the user identifier is a unique identifier provided by the cloud computing systems associated with the content service system 106. For instance, the cloud computing system previously provided the user identifier to the client device, which stored it in a digital cookie within the web browser application of the client device 300.

Additionally, the client device 300 provides a content request with the user identifier to the content service system 106 to display the new tab page 302. In response, the content service system 106 retrieves digital content items, as described herein, and provides a web page populated with content to the client device 300 for display.

In some implementations, upon selecting a content item, the content service system 106 displays a landing page that provides additional details, description, information, images, etc., of the selected content item. During these implementations, the content service system 106 can receive and fulfill additional requests to provide the landing page. In various implementations, the content service system 106 utilizes a high-quality data source to provide information displayed on the landing page.

Figure 4:
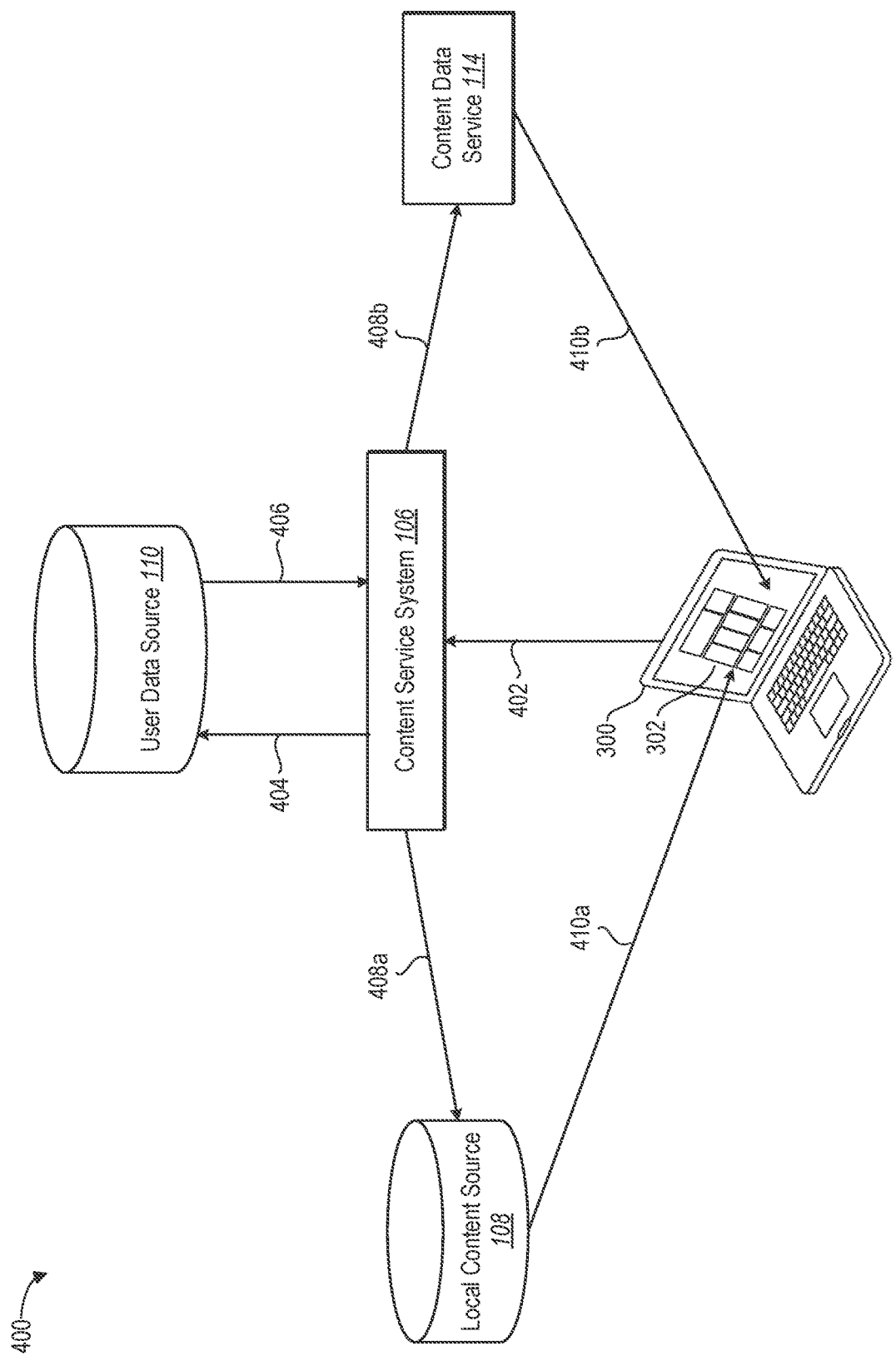
FIG. 4 illustrates an example diagram of the content service system efficiently retrieving digital content items from multiple data sources based on user data in accordance with one or more implementations.

Turning now to FIG. 4, this figure illustrates a diagram of the content service system efficiently retrieving digital content items from multiple data sources based on user data in accordance with one or more implementations. In particular, FIG. 4 shows various components and a series of acts 400 for providing digital content items to the client device 300. As shown, FIG. 4 includes the content service system 106, the local content source 108, the user data store 110, the content data service 114, the client device 300, and the new tab page 302, introduced above.

As also shown, the series of acts 400 in FIG. 4 includes an act 402 of receiving a content request. For instance, the content service system 106 receives a content request from the client device 300 to display a new tab page. In many implementations, the content request includes the user identifier of the user associated with the client device 300. In some cases, the user identifier is sent in a separate communication and/or is previously known by the content service system 106.

In various implementations, the content request is a URL (Uniform Resource Locator) request that requests loading a particular webpage (e.g., a webpage associated with a new tab page). In these implementations, the content service system 106 can determine which content types to display based on the design, scheme, or coding of the webpage. In some implementations, the content request includes a request for a particular content item or content type. In one or more implementations, the content service system 106 receives multiple corresponding content requests from a client device, such as a separate request for each type of content being requested.

While the content request corresponds to a new tab page, in various implementations, the content request corresponds to other types of services or applications. For instance, the client device 300 is a mobile phone device that is sending a content request to display content on a mobile application. In another example, a server device provides a content request to the content service system 106 to access digital content items, which the server device will further process.

Upon receiving the content request and the user identifier, the content service system 106 can provide the user identifier to a user information database to request user information. To illustrate, the series of acts 400 includes an act 404 of querying the user data store 110 for user information. In various implementations, the user data store 110 is an object data store that is accessible via an API. For example, the act 404 includes the content service system 106 sending an API call to the user data store 110 requesting user information.

In response to receiving a call or query, the user data store 110 utilizes the user identifier to identify the user information and provides it back to the content service system 106, as shown in the act 406 of the series of acts 400. For example, the user data store 110 provides a user information vector to the content service system 106 corresponding to the requested user identifier. In implementations where the content service system 106 and the user data store 110 are closely located (e.g., within the same data center and/or cloud computing system), the call and retrieval of user information may occur in under 100 ms.

Upon receiving user information (e.g., a user information vector) from the user data store 110, the content service system 106 can generate one or more service quality metrics for the user. For example, the content service system 106 generates a set of user characteristics from the user information, where the user characteristic set includes user data relevant to a given content type (e.g., a content-type-based user characteristic set). Additional details regarding obtaining user information and generating user characteristic sets are provided below in connection with FIG. 5.

Additionally, in various implementations, the content service system 106 utilizes the user characteristic set to generate a service quality metric for a given content type. For example, the content service system 106 utilizes a service quality model (i.e., a content-based service quality model) to determine a service quality metric (e.g., a score) for the user with respect to the given content type. In some implementations, the service quality metric is binary. In various implementations, the service quality metric is across a range of values or scores. Additional details regarding generating and determining service quality metrics are provided below in connection with FIG. 6.

Further, in one or more implementations, the content service system 106 can determine or select a data source for a content type or content item based on the service quality metric determined for that content type. For example, in various implementations, the content service system 106 determines to call a higher-quality data source or a lower-quality data source to retrieve content items for a given content type based on the service quality metric for the given content type. In some implementations, a higher or more favorable service quality metric corresponds to calling a higher-quality data source (and vice versa), even if larger computing costs are incurred. Additional details regarding determining which data source to call to retrieve content items for a given content type are provided below in connection with FIG. 7.

As shown in FIG. 4, the series of acts 400 includes an act 408a of calling the local content source 108 for retrieving requested content items. For example, if the content service system 106 determines to request content items from the user data store 110, the content service system 106 sends a call or query to the user data store 110 for the content items. In various implementations, the content service system 106 provides an API call to the user data store 110 that includes one or more content identifiers indicating the content items being requested (e.g., the API call includes a list of content item identifiers).

As also shown, the series of acts 400 includes an act 408b of calling the content data service 114 for retrieving requested content items. In various implementations, the content data service 114 maintains higher-quality versions of content at the expense of larger computing costs for calls. For example, the content data service 114 is located away from the content service system 106 and/or takes longer to process calls. However, in various implementations, the content service system 106 determines to retrieve content items from the content data service 114 when a corresponding service quality metric indicates that such added expense is not wasted.

In one or more implementations, the content service system 106 sends a single call to either the local content source 108 or the content data service 114 that requests, in bulk, all the content items for a given content type. For example, the content service system 106 performs either act 408a or act 408b for content items of a given content type, but not both. In alternative implementations, the content service system 106 requests some content items of a given content type from the local content source 108 and other content items of the given type from the content data service 114.

As shown, the series of acts 400 includes an act 410a and an act 410b of providing the retrieved content items to the client device 300. For example, the act 410a represents providing content items retrieved from the local content source 108 to the client device 300, and the act 410b represents providing content items retrieved from the content data service 114 to the client device 300. In various implementations, the content service system 106 provides content items from both data sources (e.g., either the same content type or different content types).

Upon receiving the requested content from the content service system 106, the client device 300 can display it. For example, the client device 300 displays the new tab page 302 by loading a webpage that includes the requested content. Additionally, the client device 300 can continue to dynamically request displaying additional content as the user interacts with the new tab page 302. For example, as the client device 300 detects the user scrolling down the webpage, the client device 300 provides additional and/or an updated content request to display additionally retrieved content from the content service system 106.

In some implementations, the content service system 106 determines which data source to call for content items based on more general requirements of the content service system 106. For example, if the content service system 106 has a requirement to serve a website (e.g., a new tab page) within a specified time (e.g., 300 ms), then the content service system 106 may exclude calling data sources that take longer than 300 ms to call. Similarly, the content service system 106 may call a data source but not receive requested content items within a time window (e.g., within 250 ms) and then call another data source to retrieve the content items to ensure that the content items are delivered within a guaranteed time (e.g., according to a service-level agreement).

In a few implementations, the content service system 106 bypasses one or more of the above actions when particular conditions are satisfied. For example, if the content service system 106 receives a request from a client device that resides in a remote area—meaning the number of client devices that access the cloud computing system in this area are below a minimum threshold, then the content service system 106 can bypass many of the above actions and directly call the content data service 114 to retrieve any requested content items. Additionally, the content service system 106 may bypass one or more actions based on additional conditions being satisfied.

Figure 5:
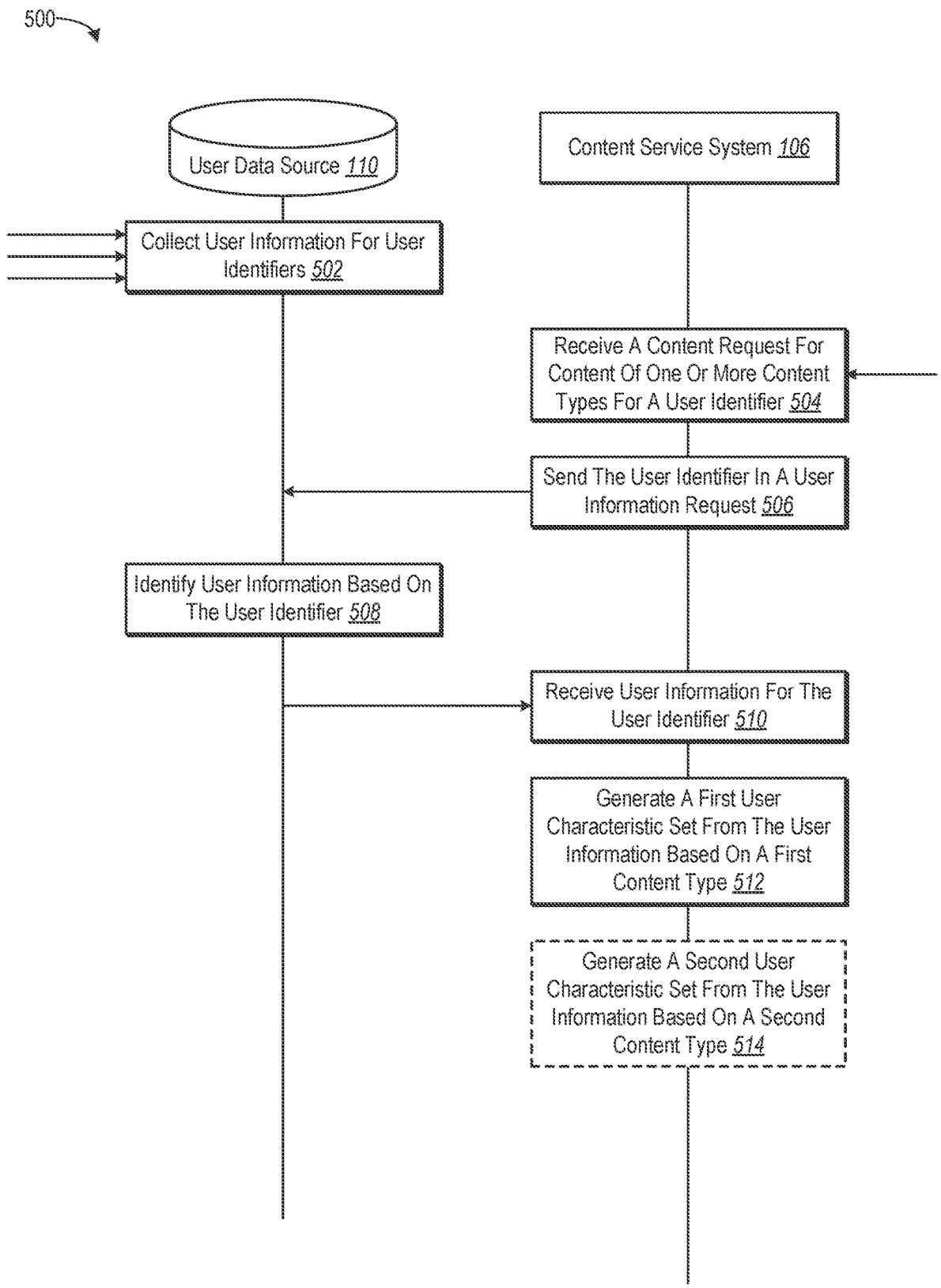
FIG. 5 illustrates an example sequence diagram of retrieving user data and generating a set of user characteristics in accordance with one or more implementations.

As mentioned above, FIG. 5 provides additional details regarding obtaining user information and generating user characteristic sets. For instance, FIG. 5 illustrates a sequence diagram of retrieving user data and generating a set of user characteristics in accordance with one or more implementations. In particular, FIG. 5 describes actions of the content service system 106 and user data store 110, as shown in a series of acts 500 for generating user characteristic sets.

As shown, the series of acts 500 includes an act 502 of the user data store 110 collecting user information for user identifiers. For example, the user data store 110 collects user information from various systems and devices. In some implementations, the user data store 110 obtains user information from client devices. In one or more implementations, the user data store 110 obtains user information that indicates user activity with third-party sites and systems (e.g., if a user browsed or purchased a product at a third-party web site).

Examples of collected user data include event signals, URLs, queries, and engagement actions along with corresponding timestamps. Additionally, collected user data can include other user information, such as demographic, economic, social, etc. In various implementations, the collected user information includes raw user data. Notably, in many implementations, users can opt-out or opt-in to the collection of user data.

To elaborate, in various implementations, the user data store 110 collects and stores user-consented information, such as first-party cookies or session information, which is associated with their user identifier. For example, a first-party cookie includes activity data stored by an entity associated with the content service system 106, which can include user activity data directly observed by the entity and/or user activity data directly observed by another entity and provided to the associated entity to be stored as part of a first-party cookie. In some implementations, the user data store 110 maintains third-party cookies associated with the user identity, which can include data collected without user consent and/or user activity data collected by one entity that occurs with respect to another entity (e.g., Entity A collects user activity data for a user identity that occurs on the website of Entity B).

In various implementations, the user data store 110 associates collected data with user identifiers. For example, the user data store 110 includes a table indexed by user identifiers to store collected user information. In this manner, the user data store 110 is able to quickly look up user information when queried.

As shown, the series of acts 500 includes an act 504 of the content service system 106 receiving a content request for content of one or more content types for a user identifier. In various implementations, the user identifier uniquely distinguishes a user from other users. In one or more implementations, multiple user identifiers are associated with the same user.

As mentioned above, the content service system 106 receives a content request from a client device (directly or indirectly) to provide content to a user associated with a user identifier. In various implementations, the content request includes a request for content of multiple content types. In some implementations, the content request is first sent to another device or system (e.g., a web server) that requests content from the content service system 106 along with providing the user identifier.

As shown, the series of acts 500 includes an act 506 of the content service system 106 sending the user identifier to the user data store 110 in a user information request. For example, the content service system 106 sends a request to the user data store 110 requesting to receive some or all user data associated with the user identifier.

In response to the user information request, the user data store 110 utilizes the user identifier to look up information stored with the user. For example, the user data store 110 uses the user identifier as a key in a user profile table to recover the collected user information. To illustrate, the series of acts 500 includes an act 508 of the user data store 110 identifying user information based on the user identifier.

In various implementations, the act 508 also includes generating a user information vector from user data stored in the user data store 110. For example, a user information vector includes raw user data collected and stored in the user data store 110. In various instances, the user data store 110 sets a user attribute or characteristic with a value of −1 to indicate a lack of user data for the attribute or characteristic. In some implementations, the user data store 110 generates another type of data structure that includes user data.

As shown, the series of acts 500 includes an act 510 of the content service system 106 receiving user information for the user identifier. In various implementations, the content service system 106 receives a user information vector that includes raw unprocessed user information, such as signals, events, interactions activities, and/or timestamps of the user identifier. In some implementations, the content service system 106 receives processed user data or a selective subset of user data associated with the user identifier from the user data store 110. For example, in these implementations, the content service system 106 receives a user characteristic set from the user data store 110.

Upon receiving this information, the content service system 106 can begin processing the user information to generate user characteristic sets. To illustrate, the series of acts 500 includes an act 512 of generating a first user characteristic set from the user information based on a first content type. For example, based on the content type, the content service system 106 determines which user data or information is relevant for the user information vector received from the user data store 110. The content service system 106 then generates a user characteristic set particular to the content type. By generating user characteristic sets that filter out unnecessary user data, the content service system 106 may process the user information more accurately and efficiently.

To illustrate, if the content type corresponds to products, then the content service system 106 filters user information that corresponds to products, such as recent product interactions, product impressions, product purchases, etc., to generate a product-based user characteristic set. As another example, if the content type corresponds to stocks, the content service system 106 generates a stock-based user characteristic set that includes applicable user information. In various implementations, each content type can include a list of user information types for the content service system 106 to include in a content-type-based user characteristic set.

In various implementations, the act 512 includes processing pieces of raw user data to generate more-usable user information. For example, if the user information received from the user data store 110 includes a timestamp for a given action, the content service system 106 processes the data to determine an elapsed time since the timestamp occurred. As another example, the content service system 106 determines if the timestamp falls within a given time window such as within the last seven days. If so, the content service system 106 generates a new processed value that indicates that a given user activity happened within the time period (e.g., within the last 7 days).

As mentioned above, in one or more implementations, user information can be retrieved from first-party cookies or third-party cookies. In some implementations, based on the source of the user information, the content service system 106 provides a data-source quality indicator as part of a user characteristic set to signal the reliability or accuracy of the user information and/or if the user consented to provide their information. For example, the user characteristic set includes one or more fields (e.g., data source quality indicators, user agreement indicators, cookie type indicators) indicating the quality of one or more pieces of user information.

As shown, the series of acts 500 includes an optional act 514 of generating a second user characteristic set from the user information based on a second content type. In various implementations, the content service system 106 needs to retrieve content corresponding to multiple content types. In these implementations, the content service system 106 generates multiple sets of user characteristics data that are specific to a given content type. As provided below, the content service system 106 can individually process each of the content-type-based user characteristic sets to determine how to receive corresponding content items.

Figure 6:
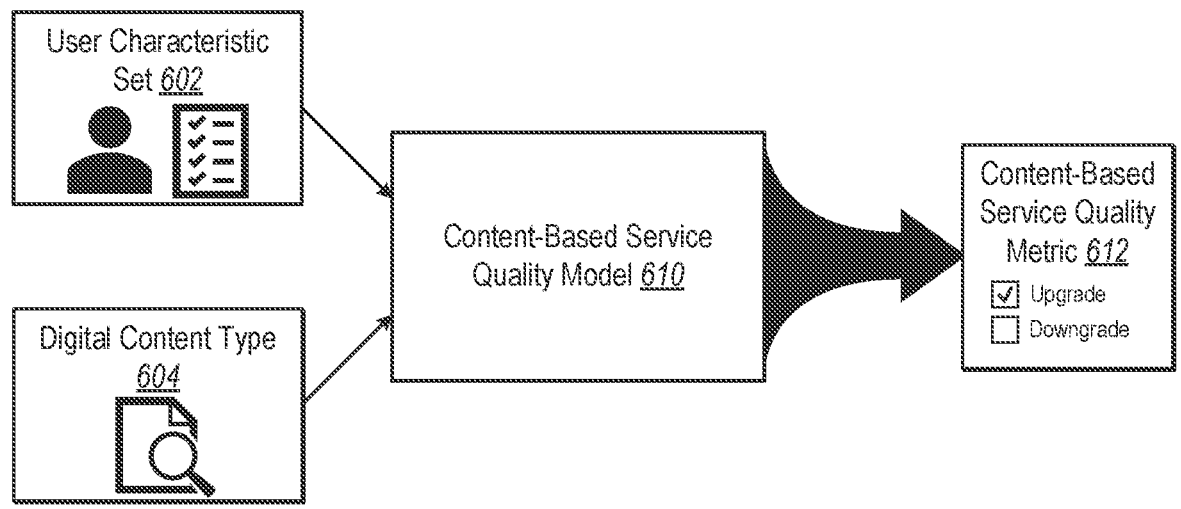
FIG. 6 illustrates an example flow diagram of generating a content-based service quality metric in accordance with one or more implementations.

As mentioned above, FIG. 6 provides additional details regarding generating service quality metrics. For instance, FIG. 6 illustrates a flow diagram of generating a content-based service quality metric in accordance with one or more implementations. As shown, FIG. 6 includes a user characteristic set 602 (e.g., a content-type-based user characteristic set), a digital content type 604, a content-based service quality model 610, and a content-based service quality metric 612. As mentioned above, in various implementations, the content service system 106 generates the content-based service quality metric 612 utilizing the content-based service quality model 610 based on the user characteristic set 602 and the digital content type 604.

The content-based service quality model 610 can represent a variety of models. For example, in a number of implementations, the content-based service quality model 610 is a machine-learning model and/or neural network trained with ground truth data, empirical data (e.g., engagement logs), and/or feedback to determine service quality metrics As another example, the content-based service quality model 610 is an algorithm model that utilizes a set of heuristic, rules, algorithm or steps to determine the content-based service quality metric 612. As an additional example, the content-based service quality model 610 is a tree-structure or graph model that follows node paths to generate the content-based service quality metric 612. The content service system 106 may use additional types of models to generate the content-based service quality metric 612.

According to one or more implementations, the content service system 106 provides a user characteristic set and a content type to the content-based service quality model 610 to signal to the model how it should process input data. For example, the model processes a first user characteristic set for a first type of content differently than a second user characteristic set for a second type of content. In some implementations, the user characteristic set indicates the content type and a separate input for the content type is not needed.

In various implementations, the content service system 106 maintains multiple service quality models and utilizes a different service quality model for different content types. For example, based on a first content type, the content service system 106 selects a first service quality model to generate service quality metrics corresponding to retrieving content items of the first content type; and based on a second content type, the content service system 106 selects a second service quality model to generate service quality metrics corresponding to retrieving content items of the second content type.

As noted above, the content-based service quality model 610 can utilize various approaches to determine a service quality metric. For example, in one or more implementations, the content-based service quality model 610 determines a service quality metric by processing the user characteristic set 602 according to one or more rule sets or heuristics. For instance, the content-based service quality model 610 identifies a rule indicating that if user activity occurs within a given time period, then the service quality metric is set to a first value; otherwise, the service quality metric is set to another value. In certain implementations, the content-based service quality model 610 identifies a rule indicating that if the user characteristic set 602 is lacking data (e.g., a new user with little or new user attributes), then determine a low or unfavorable service quality metric. In various implementations, multiple rules or a combination of rules must be met (and/or one or more other rules not met) to score the first value. In some implementations, each satisfied condition increases (or decreases) an internal score, which is mapped to service quality metric values.

As an illustrative example, suppose the content type corresponds to products and the user characteristic set includes previous interactions and times with products. In this example, the content-based service quality model 610 utilizes a set of rules, where one of the rules indicates that any detected user activity with other products within the past 7 days scores an upgraded value while the lack of user-product interaction within this time period or window scores a downgraded value. In this example, the service quality metric may be binary having values of 1 and 0 corresponding to updated and downgraded values, respectively (or vice versa).

In some implementations, the content-based service quality model 610 utilizes one or more algorithms to determine service quality metrics. For instance, the content-based service quality model 610 follows an algorithm that analyzes the user characteristic set 602 to determine user behavior patterns over time and determines what behavior the user is anticipated to perform next. Based on these results, the content-based service quality model 610 determines a service quality metric.

As mentioned above, in some implementations, the content-based service quality model 610 utilizes a machine-learning model to generate a service quality metric. For example, the content-based service quality model 610 receives the user characteristic set 602 and utilizes internal nodes having learned parameters and weights to determine a service quality metric from the various attributes and values of the user characteristic set 602.

As noted above, in some implementations, the user characteristic set 602 includes a data-source quality indicator (or similar indicator) that indicates whether a user agreed for user data in a user characteristic set to be collected or if the user data was otherwise obtained (e.g., first-party cookies vs. third-party cookies). In various implementations, the content-based service quality model 610 provides a more favorable content-based service quality metric 612 based on the user data being from a first-party cookie and a lower content-based service quality metric 612 for user data obtained from third-party cookies (e.g., the content service system 106 provides higher-quality data to user identifiers having user data obtained from first-party cookies and lower-quality data to user identifiers having user data obtained from third-party cookies). In some implementations, the content-based service quality model 610 uses one or more data source quality indicators to weight corresponding user information when determining a content-based service quality metric 612.

In various implementations, the content-based service quality metric 612 maps to data sources. For example, the number of potential values or scores of a content-based service quality metric 612 corresponds to the number of data source quality levels for a given content type. For instance, if a content type corresponds to an upgraded data source and a downgraded data source, the content-based service quality model 610 utilizes a binary value for the service quality metric. If the number of available data source quality levels is larger, the content-based service quality model 610 can increase the number of values for the service quality metric. If only one data source is available for a given content type, the content service system 106 can skip both generating the user characteristic set and utilizing the service quality model.

In alternative implementations, the content-based service quality metric 612 is determined independently from the number of data source quality levels for the given content type. For example, the service quality metric is determined according to a scale or range, such as 0-1, 1-10, 1-100, A-F, A-Z, low-to-high, premium-to-moderate, expensive-to-inexpensive, upgraded-to-downgraded. Then, the content service system 106 can subsequently map the service quality metric to a data source quality level, as described in the next figure.

Figure 7:
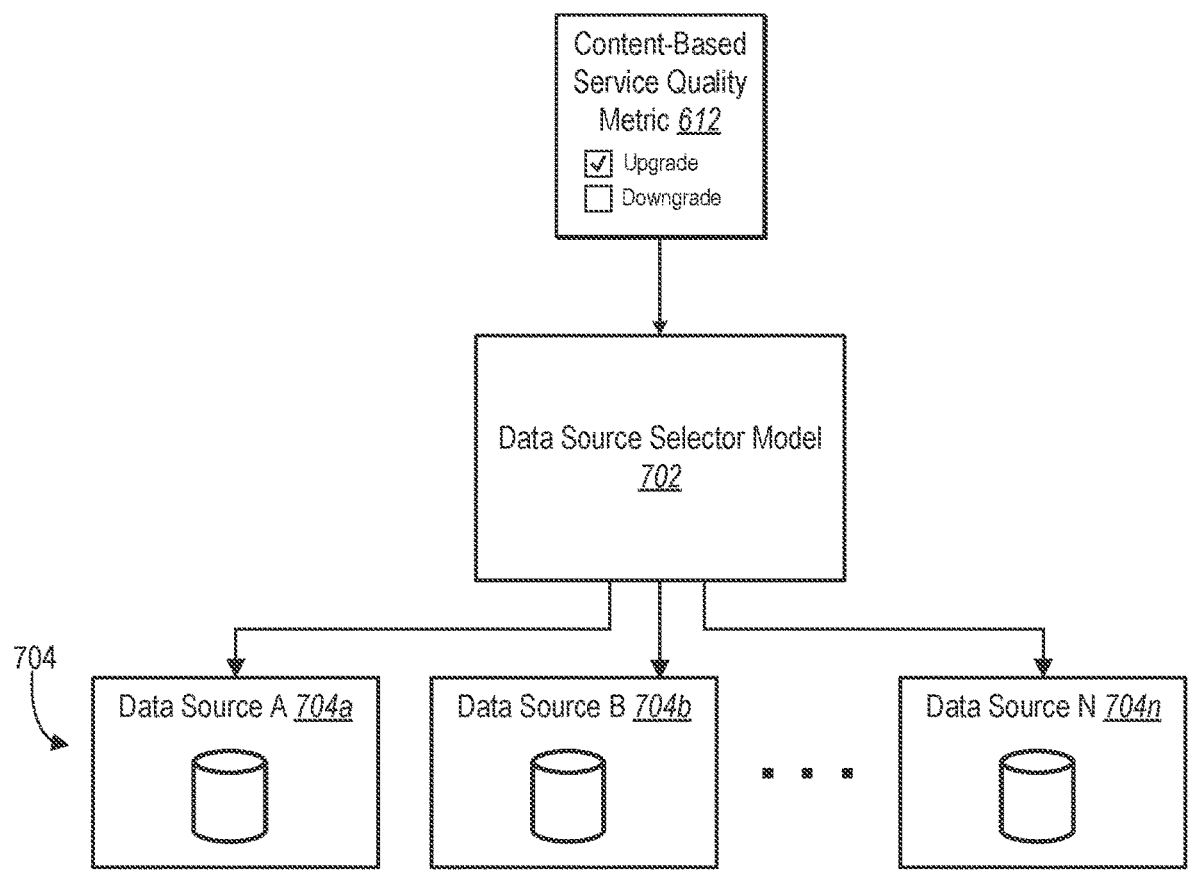
FIG. 7 illustrates an example flow diagram of determining which data source to call for retrieving digital content in accordance with one or more implementations.

As mentioned above, FIG. 7 provides additional details regarding determining which data source to dynamically call to efficiently and accurately retrieve content items for a given content type. In particular, FIG. 7 illustrates a flow diagram of determining which data source to call for retrieving digital content in accordance with one or more implementations. As shown, FIG. 7 includes the content-based service quality metric 612, a data source selector model 702, and data sources 704 (i.e., a first data source 704a, a second data source 704b, and an nth data source 704n). In many implementations, the data source selector model 702 and the data sources 704 correspond to a given content type. In some cases, a data source selector model and/or data sources can correspond to multiple content types.

In various implementations, each of the data sources 704 is associated with different quality service levels. For example, one data source provides higher-quality content and a second data source provides medium-quality content, and a third data source provides lower-quality content. In some implementations, a quality service level can include multiple data sources.

To illustrate, a data source with a low-quality service level can include a local content data store that maintains a cache of content items and is located on the same network, data center, or system as the content service system 106. For instance, a data source that maintains a local cache of millions of products that are updated periodically (e.g., once a day) can quickly and efficiently retrieve requested content items to the content service system 106. For example, a local cache that is in the same data center as the content service system 106 retrieves content items in 5-10 ms. Accordingly, this data source is considered a lower computing cost, lower-quality service level data center.

In another instance, a data source located on a different network, data center, or physical location from the content service system 106 may be rated as a medium-quality service level data source. For example, the amount of bandwidth and latency (e.g., delay) needed to make an API call to this data requires more bandwidth than a low-quality service level data source, as more networks need to be traversed and/or more processing at the data source needs to occur. For example, in these instances, the latency (e.g., a delay of around 50-100 ms) is larger than the lower-quality service level data sources but less than high-quality service level data sources.

In still another instance, a data source may have a high-quality service level if API calls to this data center have expensive computing costs. Examples of these data sources include data sources that are very remote or data sources that provide higher-quality content (e.g., the freshest, most precise, and/or highest quality versions of content) at the expense of additional computing (e.g., data sources that require lots of processing and/or additional calls to other sources). To illustrate, a data source that must send out additional queries and/or generate content commonly requires additional computing costs to retrieve the requested content (e.g., sending out additional queries to merchants to get up-to-date prices on products). In various instances, the latency to retrieve content from high-quality service level data sources can be higher (e.g., a delay of 100-500 ms).

Returning to FIG. 7, as shown the content service system 106 utilizes the data source selector model 702 to select one of the data sources 704 based on the content-based service quality metric 612. For instance, the data source selector model 702 maps the content-based service quality metric 612 to an available data source for a given content type. Then, once a data source is selected, the content service system 106 sends a call to the data source to retrieve requested content items.

To illustrate, for a first user, the data source selector model 702 receives a quality service metric having a binary value of 1 for a given content type. In response, the data source selector model 702 maps the content request and/or user identifier of the first user to the first data source 704*a* (which here represents a high-quality service level data source for the given content type), sends an API call to the first data source 704*a*, and retrieves high-quality versions of the requested content items. Additionally, for a second user, the data source selector model 702 receives a quality service metric having a binary value of 0 for the same given content type. In response, the data source selector model 702 maps the content request and/or user identifier of the second user to the second data source 704*b* (which here represents a low-quality service level data source for the given content type), sends an API call to the second data source 704*b*, and retrieves lower-quality versions of the requested content items.

In many instances, a high-quality service level data source and a lower-quality service level data source provide the same version of a content item. To elaborate, consider content items that are updated, such as a product that has occasional price changes. In some instances, the high-quality service level data source gets the current price from the merchant and guarantees a current price. However, depending on if the price has changed since the last merchant call, the lower-quality service level data source may provide an older price (e.g., the price was updated after the last periodic update to the merchant). In these instances, the data source selector model 702 may select the high-quality service level data source for select users that have a high or favorable service quality metric (e.g., a likelihood of product interaction) and select the lower-quality service level data source for the majority of other users with less-favorable service quality metrics (e.g., no likelihood of product interaction).

As a practical application of this invention, in many instances, most users are determined by the content service system 106 to have low service quality metrics for various content types. For example, when a user visits a new tab page, the content service system 106 determines that 90% of users have a binary service quality metric of 0 for products (e.g., shopping), which indicates a low probability of these users interacting with products displayed within the new tab page (where each user is provided with a customized set of products). Accordingly, rather than expending a large number of computing costs to retrieve up-to-date prices and information from a higher-quality service level data source, the content service system 106 determines to retrieve content items of products from a local cache data source (i.e., a lower-quality service level) at a much lower computing cost, which results in significant computing resource savings.

When additional content types are considered, the content service system 106 provides additional computational savings. For example, for users that peruse the news, stocks, weather, or other specific type of content frequently, the content service system 106 determines to call more expensive data sources that have the freshest, most detailed, and/or higher-quality versions of corresponding content items. For the majority of other users, the content service system 106 calls a less computationally expensive data source that provides acceptable versions of the corresponding content.

Additionally, empirical evidence suggests that of the 90% of users that are shown content from the local cache data source, less than 10% of the products include stale data. Indeed, the content service system 106 achieves large computational savings with a negligible amount of impact on user experiences. Further, the content service system 106 sends significantly fewer API calls to expensive data sources in favor of computationally cheaper API calls with the product data being the same the majority of the time.

Figure 8:
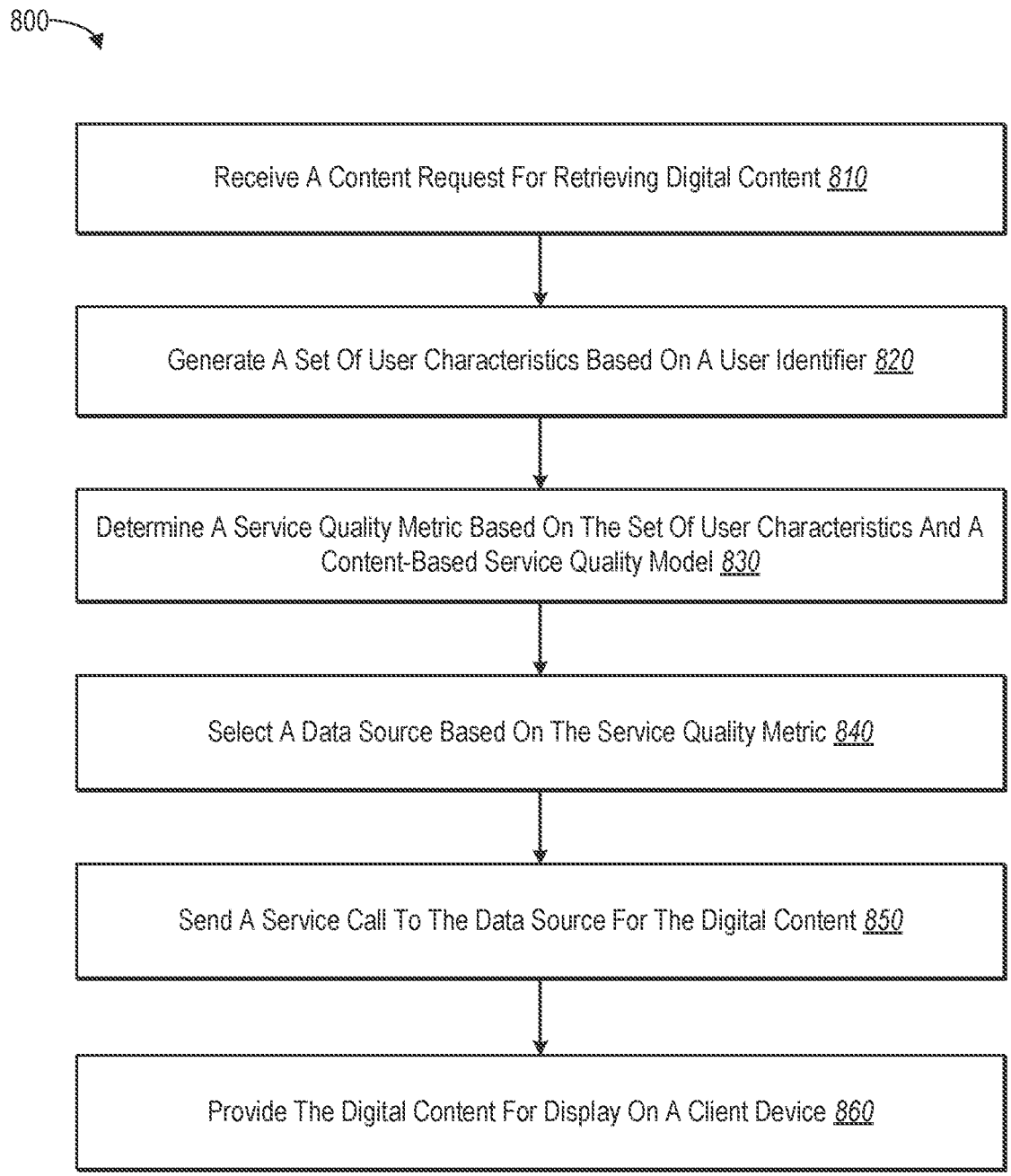
FIG. 8 illustrates an example series of acts for providing digital content from a data source determined based on user data in accordance with one or more implementations.

Turning now to FIG. 8, this figure illustrates an example flowchart that includes a series of acts 800 for utilizing the content service system 106 in accordance with one or more implementations. In particular, FIG. 8 illustrates a series of acts 800 for providing digital content from a data source determined based on user data in accordance with one or more implementations.

While FIG. 8 illustrates acts according to one or more implementations, alternative implementations may omit, add to, reorder, and/or modify any of the acts shown. Further, the acts of FIG. 8 can be performed as part of a method. Alternatively, a non-transitory computer-readable medium can include instructions that, when executed by at least one processor, cause a computing device to perform the acts of FIG. 8. In still further implementations, a system can perform the acts of FIG. 8.

As shown, the series of acts 800 includes an act 810 of receiving a content request (e.g., a first content request) for retrieving digital content. For instance, the act 810 may involve receiving a content request for retrieving digital content of a given digital content type for display on a website to be provided to a client device associated with a user identifier. In one or more implementations, the act 810 includes receiving a content request for displaying digital content of a given digital content type on a client device associated with a user identifier.

In some implementations, the act 810 includes receiving a content request for retrieving a first digital content item of a first digital content type and a second digital content item of a second digital content type for display on a client device associated with a user identifier. In various implementations, the content request corresponds to displaying the digital content on a webpage that includes multiple different digital content types.

As further shown, the series of acts 800 includes an act 820 of generating a set of user characteristics based on a user identifier. For example, the act 820 may involve generating a first set of user characteristics based on user data associated with the user identifier. In one or more implementations, the act 820 includes generating user characteristics based on user data associated with the user identifier. In various implementations, the act 820 includes providing the user identifier to a user information database to request user information, receiving a user information vector from the user information database, and generating a set of user characteristics for the user identifier based on the user information vector. In some implementations, the act 820 includes receiving user data associated with the user identifier based on calling a user database with the user identifier.

As further shown, the series of acts 800 includes an act 830 of determining a service quality metric based on the set of user characteristics and a content-based service quality model. For example, the act 830 may include determining a service quality metric based on the first set of user characteristics and a model associated with the given digital content type. In one or more implementations, the act 830 includes determining a service quality metric based on the user identifier and a model associated with the given digital content type.

In some implementations, the act 830 includes determining a second service quality metric based on the user characteristics and a second model associated with the second digital content type, where the first service quality metric is different from the second service quality metric. In various implementations, determining the service quality metric includes processing the set of user characteristics utilizing the model associated with the given digital content type to determine the service quality metric. In one or more implementations, determining the service quality metric based on the first set of user characteristics and the model associated with the given digital content type includes processing the first set of user characteristics utilizing the model associated with the given digital content type to generate a service quality metric that is particular to digital content having the given digital content type. In certain implementations, the first service quality metric is a first binary value and the second service quality metric is a second binary value is different from the first binary value.

As further shown, the series of acts 800 includes an act 840 of selecting a data source based on the service quality metric. For example, the act 840 may involve selecting a first data source from a plurality of data sources based on the service quality metric. In one or more implementations, the act 840 includes selecting, based on the first service quality metric, a first data source for retrieving the first digital content item. According to some implementations, the act 840 includes selecting, based on the second service quality metric, a second data source for retrieving the second digital content item. In various implementations, the act 840 includes determining the data source from the plurality of data sources based on comparing the service quality metric to a plurality of service quality metrics.

As further shown, the series of acts 800 includes an act 850 of sending a service call to the data source for the digital content. For example, the act 850 may include sending a service call to the first data source for the digital content based on selecting the first data source. In some implementations, the act 850 includes providing a service call for the digital content to a data source determined from a plurality of data sources based on the service quality metric.

As further shown, the series of acts 800 includes an act 860 of providing the digital content for display on a client device. For example, the act 860 may include providing the digital content for display on the website in response to the content request. In some implementations, the act 860 includes providing the digital content to the client device in response to the content request, providing the first digital content item and the second digital content item to the client device for display in response to the content request, and/or providing the digital content to the client device in response to the content request by generating a website that includes the digital content along with additional digital content from additional data sources.

Additionally, in some implementations, the act 860 includes sending a first service call to the first data source to retrieve the first digital content item and sending a second service call to the second data source to retrieve the second digital content item. In one or more implementations, sending the first service call to the first data source includes requesting retrieval of a plurality of digital content items of the first digital content type.

In some implementations, the series of acts 800 includes additional acts. For example, in certain implementations, the series of acts 800 includes acts of receiving an additional content request (e.g., a second content request) for displaying digital content of an additional given digital content type (e.g., a second digital content type) on the client device; determining an additional service quality metric based on the user identifier and an additional model associated with the additional given digital content type, where the model differs from the additional model; and providing an additional service call for the additional digital content to an additional data source determined from the plurality of data sources based on the additional service quality metric. In some implementations, calling the additional data source has a different latency (e.g., delay) than calling the data source and/or calling the second data source has a larger computing delay to receive the digital content than calling the first data source.

In various implementations, the service quality metric corresponds to a less favorable user score than the additional service quality metric and/or calling the additional data source requires greater bandwidth and latency than calling the data source. In some implementations, a server device located at a data center receives the content request and provides the service call for the digital content to the data source and the data source includes a cache database located at the data center. According to some implementations, a server device located at a data center receives the content request and provides the service call for the digital content to the data source, the data source is located at a different physical location than the server device, and calls to the data source require more bandwidth than calls to data sources located at the data center.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the content service system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by at least one processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 9:
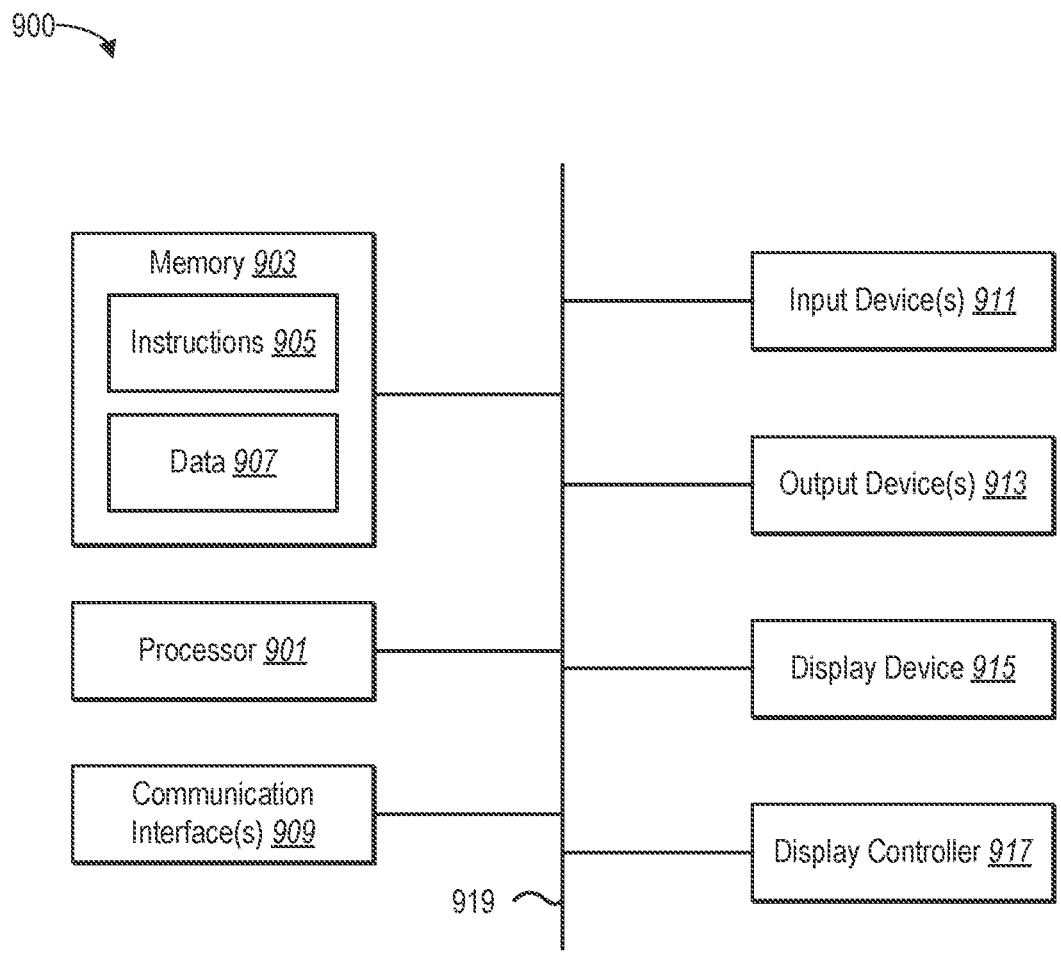
FIG. 9 illustrates certain components that may be included within a computer system.

FIG. 9 illustrates certain components that may be included within a computer system 900. The computer system 900 may be used to implement the various computing devices, components, and systems described herein.

In various implementations, the computer system 900 may represent one or more of the client devices, server devices, or other computing devices described above. For example, the computer system 900 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processor 901 (i.e., at least one processor). The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates in accordance with an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer-implemented method comprising:
   receiving a first content request for displaying digital content of a first digital content type on a client device associated with a user identifier;
   determining a service quality model associated with the first digital content type based on the first digital content type of the first content request;
   determining a first service quality metric based on a set of user characteristics associated with the user identifier by using the service quality model associated with the first digital content type;

providing a service call for the digital content of the first digital content type to a first data source determined from a plurality of data sources based on the first service quality metric; and providing the digital content of the first digital content type to the client device in response to the first content request.

2. The computer-implemented method of claim 1, further comprising:

receiving a second content request to display digital content of a second digital content type on the client device;

determining a second service quality metric based on the user identifier and an additional model associated with the second digital content type, wherein the service quality model differs from the additional model; and providing an additional service call for the digital content of the second digital content type to a second data source determined from the plurality of data sources based on the second service quality metric.

3. The computer-implemented method of claim 2, wherein calling the second data source has a different latency than calling the first data source.

4. The computer-implemented method of claim 3, wherein:

the first service quality metric corresponds to a less favorable user score than the second service quality metric; and calling the second data source uses more bandwidth and latency than calling the first data source.

5. The computer-implemented method of claim 1, wherein the first content request corresponds to displaying the digital content of the first digital content type on a webpage that comprises displays of multiple different digital content types.

6. The computer-implemented method of claim 1, further comprising:

providing the user identifier to a user information database to request user information;

receiving a user information vector from the user information database; and generating the set of user characteristics for the user identifier based on the user information vector.

7. The computer-implemented method of claim 6, wherein the set of user characteristics includes user activity that occurs within a given time period.

8. The computer-implemented method of claim 1, further comprising determining the first data source from the plurality of data sources based on comparing the first service quality metric to a plurality of service quality metrics.

9. The computer-implemented method of claim 1, wherein providing the digital content of the first digital content type to the client device in response to the first content request comprises generating a website that includes the digital content of the first digital content type along with additional digital content from additional data sources.

10. The computer-implemented method of claim 1, wherein:

a server device located at a data center receives the first content request and provides the service call for the digital content of the first digital content type to the first data source; and the first data source comprises a cache database located at the data center.

11. The computer-implemented method of claim 1, wherein:

a server device located at a data center receives the first content request and provides the service call for the digital content of the first digital content type to the first data source;

the first data source is located at a different physical location than the server device; and calls to the first data source use more bandwidth than calls to one or more data sources located at the data center.

12. A system comprising:

at least one processor; and a computer memory comprising instructions that, when executed by the at least one processor, cause the system to:

receive a content request for retrieving digital content of a given digital content type for display on a website to be provided to a client device associated with a user identifier;

generate a first set of user characteristics based on user data associated with the user identifier;

determine a service quality model associated with the given digital content type based on the given digital content type of the content request;

determine a service quality metric based on the first set of user characteristics a by using the service quality model associated with the given digital content type;

select a first data source from a plurality of data sources based on the service quality metric;

send a service call to the first data source for the digital content based on selecting the first data source; and provide the digital content for display on the website in response to the content request.

13. The system of claim 12, further comprising instructions that, when executed by the at least one processor, cause the system to receive user data associated with the user identifier based on calling a user database with the user identifier.

14. The system of claim 12, wherein determining the service quality metric based on the first set of user characteristics and the service quality model associated with the given digital content type comprises processing the first set of user characteristics utilizing the service quality model associated with the given digital content type to generate the service quality metric that is particular to digital content having the given digital content type.

15. The system of claim 12, further comprising instructions that, when executed by the at least one processor, cause the system to:

receive an additional content request to display additional digital content of an additional given digital content type on the client device;

determine an additional service quality metric based on a second set of user characteristics and an additional model associated with the additional given digital content type, wherein the service quality model differs from the additional model; and send an additional service call for the additional digital content to a second data source determined from the plurality of data sources based on the additional service quality metric.

16. The system of claim 15, wherein calling the second data source has a larger computing delay to receive the digital content than calling the first data source.

17. A computer-implemented method comprising:

receiving a content request for retrieving a first digital content item of a first digital content type and a second digital content item of a second digital content type for display on a client device associated with a user identifier;

generating user characteristics based on user data associated with the user identifier;

determine a first model associated with the first digital content type based on the first digital content type of the content request for the first digital content item;

determining a first service quality metric based on the user characteristics and using the first model associated with the first digital content type;

selecting, based on the first service quality metric, a first data source for retrieving the first digital content item;

determine a second model associated with the second digital content type based on the second digital content type of the content request for the second digital content item;

determining a second service quality metric based on the user characteristics by using the second model associated with the second digital content type, wherein the first service quality metric is different from the second service quality metric;

selecting, based on the second service quality metric, a second data source for retrieving the second digital content item; and providing the first digital content item and the second digital content item to the client device for display in response to the content request.

18. The computer-implemented method of claim 17, further comprising:

sending a first service call to the first data source to retrieve the first digital content item; and sending a second service call to the second data source to retrieve the second digital content item.

19. The computer-implemented method of claim 18, wherein sending the first service call to the first data source comprises requesting retrieval of a plurality of digital content items of the first digital content type.

20. The computer-implemented method of claim 17, wherein the first service quality metric is a first binary value and the second service quality metric is a second binary value.

* * * * *